US 11,619,854 B2

(12) United States Patent
Yoon et al.

(10) Patent No.: US 11,619,854 B2
(45) Date of Patent: Apr. 4, 2023

(54) FILM HAVING VARIABLE TRANSMITTANCE (71) Applicant: LG Chem, Ltd., Seoul (KR)

(72) Inventors: Young Sik Yoon, Daejeon (KR); Tae Gyun Kwon, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 303 days.

(21) Appl. No.: 16/759,915

(22) PCT Filed: Nov. 2, 2018

(86) PCT No.: PCT/KR2018/013265
§ 371 (c)(1),
(2) Date: Apr. 28, 2020

(87) PCT Pub. No.: WO2019/088766
PCT Pub. Date: May 9, 2019

(65) Prior Publication Data
US 2020/0326604 A1 Oct. 15, 2020

(30) Foreign Application Priority Data
Nov. 3, 2017 (KR) .................. 10-2017-0145699

(51) Int. Cl.
G02F 1/1676 (2019.01)
G02F 1/167 (2019.01)
G02F 1/1675 (2019.01)

(52) U.S. Cl.
CPC .......... G02F 1/1676 (2019.01); G02F 1/167 (2013.01); G02F 2001/1678 (2013.01)

(58) Field of Classification Search
CPC ............. G02F 1/167; G02F 1/16757; G02F 2001/1678; G02F 1/1679; G02F 1/1677;
(Continued)

(56) References Cited

U.S. PATENT DOCUMENTS

2004/0196525 A1* 10/2004 Fujii .................... G02B 26/005
359/245
2004/0252076 A1* 12/2004 Kodama ................ G09G 3/344
345/3.1
(Continued)

FOREIGN PATENT DOCUMENTS

JP 2005099408 A 4/2005
JP 2006058563 A 3/2006
(Continued)

OTHER PUBLICATIONS

International Search Report from Application No. PCT/KR2018/013265 dated Feb. 13, 2019, 2 pages.

Primary Examiner — Brandi N Thomas
(74) Attorney, Agent, or Firm — Lerner, David, Littenberg, Krumholz & Mentlik, LLP (57) ABSTRACT A transmittance-variable film, a use thereof, and a smart window including the same are disclosed herein. In some embodiments, a transmittance-variable film includes a first electrode substrate, a first electrode insulating layer disposed on the first electrode substrate, an electrophoretic layer, a second electrode insulating layer, and a second electrode insulating layer disposed on the second electrode substrate, wherein the first electrode substrate, the electrophoretic layer, and the second electrode substrate are sequentially arranged, and wherein the first and second electrode insulating layers contain a fluorine-based resin. Upon repeated driving of the film between a transparent mode and a black mode, the transmittance-variable film can maintain a transmittance constant in the transparent mode and exhibit an excellent light shielding ratio in the black mode.

19 Claims, 4 Drawing Sheets (58) Field of Classification Search
CPC .............. G02F 1/1676; G02F 1/133305; G02F
1/16756; G02F 1/1334; G02F 1/1343;
G02F 1/1345; G02F 1/1685; G02F
2202/28; G02F 2203/34; G02F 1/1335;
G02F 1/133553; G02F 1/133605; G02F
1/133615; G02F 1/133616; G02F
1/134363; G02F 1/1368; G02F 1/1675;
G02F 1/23; G02F 1/133345; G02F
1/13336; G02F 1/133377; G02F 1/135;
G02F 1/136227; G02F 1/1365; G02F
1/16753; G02F 1/16755; G02F 1/1681;
G02F 2201/122; G02F 2201/124; G02F
2201/50; G02F 2202/04; G02F 2202/14;
G02F 2202/36; G09G 3/344; G09G
2300/08; G09G 3/3446; G09G 2310/06;
G09G 3/2074; G09G 2320/0209; G09G
2330/021; G09G 2300/023; G09G
2300/0426; G09G 2300/043; G09G
2300/0452; G09G 2300/06; G09G
2310/061; G09G 2320/0252; G09G
2320/0204; G09G 2320/0276; G09G
2330/02; G09G 2380/04; G09G 3/035;
G09G 3/16; G09G 3/2096; G09G 3/34;
G09G 5/006

See application file for complete search history.

(56) References Cited

U.S. PATENT DOCUMENTS

| | | | |
|---|---|---|---|
| 2010/0177374 A1 | 7/2010 | Nam | |
| 2012/0092752 A1* | 4/2012 | Kim | G02F 1/167 |
| | | | 359/296 |
| 2016/0012762 A1* | 1/2016 | Joo | G09G 3/2003 |
| | | | 345/690 |
| 2017/0068145 A1 | 3/2017 | Nakamura et al. | |
| 2017/0153525 A1 | 6/2017 | Lim et al. | |
| 2017/0369771 A1* | 12/2017 | Kim | G02F 1/157 |

FOREIGN PATENT DOCUMENTS

| | | |
|---|---|---|
| JP | 2006276839 A | 10/2006 |
| JP | 2009271387 A | 11/2009 |
| JP | 2016511447 A | 4/2016 |
| JP | 2016540249 A | 12/2016 |
| JP | 2017040896 A | 2/2017 |
| JP | 2017049552 A | 3/2017 |
| KR | 20100058882 A | 6/2010 |
| KR | 20110015321 A | 2/2011 |
| KR | 101241306 B1 | 3/2013 |
| KR | 20130040997 A | 4/2013 |
| KR | 20150062240 A | 6/2015 |
| KR | 101544589 B1 | 8/2015 |
| WO | WO 2011020013 * | 2/2011 |

* cited by examiner

FILM HAVING VARIABLE TRANSMITTANCE

CROSS-REFERENCE TO RELATED APPLICATION(S)

The present application is a National Phase entry under 35 U.S.C. § 371 of International Application No. PCT/KR2018/013265, filed on Nov. 2, 2018, which claims priority from Korean Patent Application No. 10-2017-0145699, filed on Nov. 3, 2017, the disclosures of which are incorporated by reference herein.

TECHNICAL FIELD

This disclosure relates to a transmittance-variable film and a use thereof.

BACKGROUND ART

A transmittance-variable film may sequentially comprise a first electrode substrate on which an overall electrode layer is formed, an electrophoretic layer, and a second electrode substrate on which a pattern electrode layer is formed, where the electrophoretic layer may be equipped with charged particles in the form of particles capable of exhibiting an electrophoretic phenomenon by external force applied from the outside.

In Patent Document 1 (Korean Patent Publication No. 10-1241306), a negatively charged substance is used as charged particles and the charged particles exist in a state dispersed in the electrophoretic layer at the beginning without external force applied from the outside, and in the case of being irradiated with light between the patterns of the pattern electrode layer in the second electrode substrate, a black mode for blocking the light is implemented. At this time, the charged particles may be moved on the patterns of the pattern electrode layer by applying a positive voltage to the pattern electrode layer in the second electrode substrate and applying a negative voltage to the overall electrode layer in the first electrode substrate to realize a transparent mode that the light can be transmitted between the patterns of the pattern electrode layer. Thereafter, when a voltage is not applied to the pattern electrode layer or a negative voltage, which is the opposite voltage, is applied to the pattern electrode layer, the charged particles may be dispersed again to realize the black mode.

However, after the transmittance-variable film using such an electrophoretic phenomenon is driven, due to the repetition of the transparent mode and the black mode, the charged particles are adsorbed on the pattern electrode layer, so that the transmittance is gradually reduced when the transparent mode is implemented and the dispersibility of the charged particles is lowered when the black mode is implemented, whereby there has been a problem that the light shielding ratio is significantly reduced as compared with the early black mode. Therefore, a transmittance-variable film is required to solve such a problem.

EXPLANATION OF REFERENCE NUMERALS

110: first electrode substrate
111: first base film
112: pattern electrode layer
120: electrophoretic layer
121: charged particles
130: second electrode substrate
131: second base film
132: overall electrode layer
140A, 140B: electrode insulating layer

DISCLOSURE

Technical Problem

It is an object of the present disclosure to provide a transmittance-variable film capable of maintaining transmittance constant in a transparent mode and exhibiting an excellent light-shielding ratio in a black mode upon repetition of drive between the transparent mode and the black mode, by comprising an electrode insulating layer on an electrode, and a use thereof.

Technical Solution

The present disclosure relates to a transmittance-variable film. According to an exemplary transmittance-variable film of the present disclosure, an electrode insulating layer is included on an electrode, whereby a transmittance-variable film capable of maintaining transmittance constant in a transparent mode and exhibiting an excellent light-shielding ratio in a black mode upon repetition of drive between the transparent mode and the black mode and a use thereof can be provided.

Hereinafter, the transmittance-variable film of the present disclosure will be described with reference to the accompanying drawings, where the attached drawings are illustrative and the transmittance-variable film of the present disclosure is not limited to the attached drawings.

Figure 1:
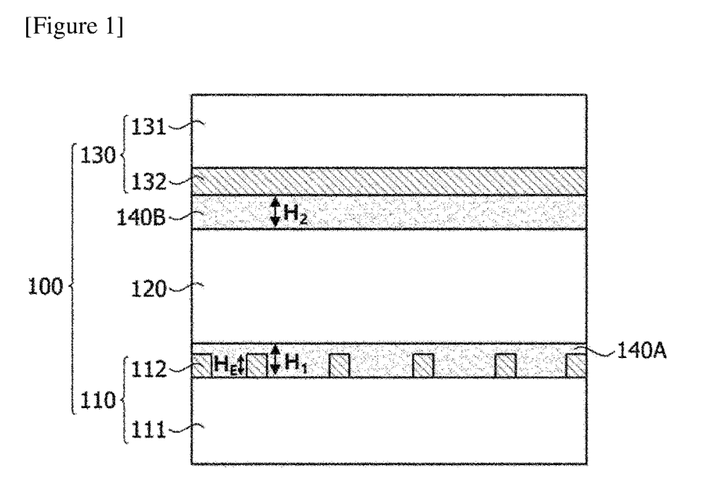
FIG. 1 is a diagram illustratively showing a transmittance-variable film according to one example of the present disclosure.

FIG. 1 illustratively shows a transmittance-variable film according to one example of the present disclosure. As shown in FIG. 1, the transmittance-variable film (100) comprises a first electrode substrate (110), an electrophoretic layer (120) and a second electrode substrate (130) sequentially, where electrode insulating layers (140A, 140B) are included on the first electrode substrate (110) and the second electrode substrate (130).

The first electrode substrate (110) and the second electrode substrate (130) are portions, to which a voltage is applied from the outside, in order to realize an electrophoretic phenomenon of charged particles in the transmittance-variable film (100). In one example, any one of the first electrode substrate (110) and the second electrode substrate (130) may comprise a pattern electrode layer (112), and the other may comprise an overall electrode layer (132). Specifically, the first electrode substrate (110) may comprise a pattern electrode layer (112) formed on a first base film (111) and the second electrode substrate (130) may comprise an overall electrode layer (132) formed on a second base film (131).

In this specification, the pattern electrode layer (112) means that the electrode is formed in a pattern shape, where the pattern shape can be appropriately selected in consideration of the object of the present disclosure. For example, the pattern shape may be a mesh shape, a stripe shape or a Voronoi shape.

Also, the overall electrode layer herein means that the electrode is formed on the entire one surface of the base film.

As the first and second base films (111, 131), those having optical transparency can be used. For example, as the first and second base films (111, 131), an optically transparent plastic film or sheet can be used or glass can be used. Specifically, the plastic film or sheet can be exemplified by a cellulose film or sheet such as a DAC (diacetyl cellulose) or TAC (triacetyl cellulose) film or sheet; a COP (cycloolefin copolymer) film or sheet such as a norbornene derivative resin film or sheet; an acrylic film or sheet such as a PMMA (poly(methyl methacrylate)) film or sheet; a PC (polycarbonate) film or sheet; an olefin film or sheet such as a PE (polyethylene) or PP (polypropylene) film or sheet; a PVA (polyvinyl alcohol) film or sheet; a PES (poly ether sulfone) film or sheet; a PEEK (polyether ether ketone) film or sheet; a PEI (polyetherimide) film or sheet; a PEN (polyethylenenaphthatate) film or sheet; a polyester film or sheet such as a PET (polyethyleneterephtalate) film or sheet; a PI (polyimide) film or sheet; a PSF (polysulfone) film or sheet; a PAR (polyarylate) film or sheet; or a fluorine-based resin film or sheet, and the like, and generally, a cellulose film or sheet, a polyester film or sheet, or an acrylic film or sheet, and the like can be used, and preferably, a TAC film or sheet can be used, but it can be suitably selected in consideration of the purpose of the present disclosure.

As the pattern electrode layer (112) and the overall electrode layer (132), a transparent conductive layer may be used. For example, as the pattern electrode layer (112) and the overall electrode layer (132), those formed by depositing a conductive polymer, a conductive metal, a conductive nanowire or a metal oxide such as ITO (indium tin oxide), and the like may be used. Specifically, aluminum (Al) may be used as the pattern electrode layer (112), and indium tin oxide (ITO) may be used as the overall electrode layer (132).

The sizes of the pattern electrode layer (112) and the overall electrode layer (132) can be appropriately selected within a range that does not impair the purpose of the present disclosure. The pattern electrode layer may have a thickness in a range of, for example, 100 nm to 200 nm, and specifically, 120 nm to 180 nm or 140 nm to 150 nm. The pattern electrode layer may have a line width in a range of 1 µm to 10 µm, and specifically, 1 µm to 5 µm or 2 µm to 4 µm. The patterns in the pattern electrode layer may have an average pitch in a range of, for example, 10 µm to 100 µm, and specifically, 30 µm to 70 µm or 40 µm to 60 µm. The overall electrode layer may have a thickness in a range of, for example, 50 nm to 150 nm, and specifically, 80 nm to 120 nm. When the size of the pattern electrode layer or the overall electrode layer is within the above range, the present disclosure may be appropriate to realize the electrophoretic phenomenon of charged particles in the electrophoretic layer (120) when the external voltage is applied.

The electrode insulating layers (140A, 140B) may mean nonconductors that electricity does not flow. In one example, the electrode insulating layers (140A, 140B) may be formed on the entire surface of the pattern electrode layer (112) and the overall electrode layer (132). The entire surface of the pattern electrode layer may mean, in a state where the pattern electrode layer is formed on the base film, the top surface and side surfaces of the pattern electrode layer excluding the bottom surface in contact with the base film. Also, the electrode insulating layer (140A) may be formed in regions, where the pattern electrode layer (112) is not formed, on the first base film (111). Accordingly, the electrode insulating layer (140A) may have a flat surface facing the electrophoretic layer. As the electrode insulating layers (140A, 140B) are formed on the entire surface of the pattern electrode layer (112) and the overall electrode layer (132), it is possible to prevent the charged particles from being adsorbed on the electrode layers (112, 132), and thus the transmittance-variable film (100) of the present disclosure can maintain the constant transmittance when the transparent mode is implemented after driving, and can exhibit an excellent light shielding ratio when the black mode is implemented.

The electrophoretic layer (120) is a layer that changes light transmittance by charged particles. Specifically, the light transmittance may be adjusted to express the desired color by an electrophoresis method in which charged particles are rotated or move closer to an electrode with different polarity according to a voltage applied to the pattern electrode layer (112) and the overall electrode layer (132) existing in upper and lower parts of the electrophoretic layer (120).

In one example, the electrophoretic layer (120) may comprise a dispersion solvent and charged particles. As the charged particles, positively (+) or negatively (−) charged particles can be used. For example, one or more charged particles selected from the group consisting of carbon black, ferric oxides, chromium copper (CrCu) and aniline black can be used, and preferably, carbon black particles can be used. Furthermore, as the dispersion solvent for dispersing the charged particles, a known solvent such as a hydrocarbon-based solvent may be used without limitation. For example, as the hydrocarbon-based solvent, a common alkane solvent such as pentane, hexane, heptane, octane, nonane, decane, undecane, dodecane, or an isomer or mixture thereof may be used. In addition, as the dispersion solvent, an isoparaffinic solvent such as an alkane mixture substance having 6 to 13 carbon atoms may be used. For example, Isopar C, Isopar G, Isopar E (Exxon), ISOL-C (SK Chem) or ISOL-G (Exxon), and the like can be used as the isoparaffinic solvent.

The content of the charged particles in the electrophoretic layer may be 0.5 wt % to 5 wt %. When the content of the charged particles is within the above range, it may be advantageous in terms of providing a transmittance-variable film having excellent transmittance-variable characteristics.

Figure 2:
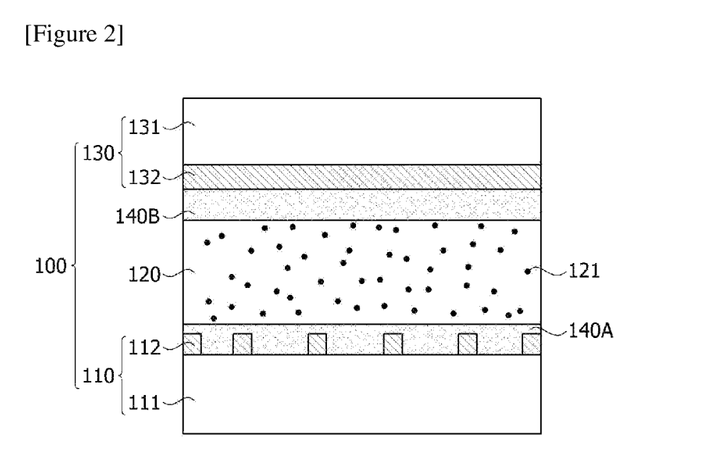
FIG. 2 is a diagram illustratively showing a transmittance-variable film implementing a black mode at the beginning and after driving according to one example of the present disclosure.
Figure 3:
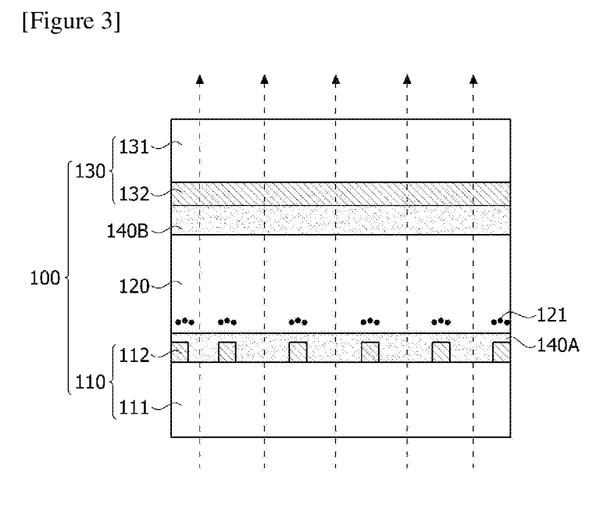
FIG. 3 is a diagram illustratively showing a transmittance-variable film implementing a transparent mode after driving according to one example of the present disclosure.

The charged particles may be dispersed in a particle state in the dispersion solvent to implement the black mode, and may move to the pattern electrode (112) to implement the transparent mode. For example, as shown in FIG. 2, the transmittance-variable film (100) may be implemented in the black mode, as the charged particles (121) in the electrophoretic layer (120) are dispersed in a particle state in an initial state where a voltage is not applied to the overall electrode (132) and the pattern electrode (112) existing on the upper and lower parts of the electrophoretic layer (120). Thereafter, as shown in FIG. 3, when the charged particles (121) bear negative charges, a positive voltage is applied to the pattern electrode layer (112) existing on the lower part of the electrophoretic layer (120) and a negative voltage is applied to the overall electrode layer (132) existing on the upper part of the electrophoretic layer (120), the repulsive force acts between the charged particles (121) and the overall electrode layer (132), and the attractive force acts between the charged particles (121) and the pattern electrode layer (112), so that the charged particles (121) move to the pattern electrode layer (112), whereby the transparent mode can be implemented. Thereafter, as shown in FIG. 2, when the voltage is not applied to the pattern electrode layer (112) and the overall electrode layer (132) again, the transmittance-variable film (100) can be implemented in the black mode, as the charged particles (121) are again dispersed in a particle state in the electrophoretic layer (120) similarly to the initial state.

At this time, the charged particles (121) move to the pattern electrode layer (112) upon the implementation of the transparent mode, as described above, where the electrode insulating layers (140A, 140B) may not only physically prevent the charged particles (121) from being adsorbed on the pattern electrode layer (112), but also reduce the attractive force applied to the charged particles (121) from the electrode layers (112, 132) to prevent the charged particles (121) from being adsorbed on the pattern electrode layer (112). Specifically, the charged particles (121) may be present in contact with the electrode insulating layers (140A, 104B) having low surface energy upon the implementation of the transparent mode, without being adsorbed on the pattern electrode layer (112). Accordingly, the charged particles (121) may exist in a spaced-apart state, without being adsorbed on the pattern electrode layer (132).

The transmittance-variable film (100) may be repeatedly driven between a transparent mode and a black mode depending on voltage application.

In one example, the voltage applied upon the black mode implementation may be −10 V to −30 V, but may be suitably selected within the above-mentioned range in consideration of the purposes of the present disclosure. For example, when the transmittance-variable film (100) is implemented in the black mode, the applied voltage may be −13 V to −27 V, −15 V to −25 V or −18 V to −22 V. When the transmittance-variable film (100) is implemented in the black mode, it can switch from the transparent mode to the black mode by applying a voltage thereto within the above-mentioned range.

In addition, the voltage applied upon the transparent mode implementation may be 10 V to 50V. Specifically, when it is implemented in the transparent mode, the voltage applied to the transmittance-variable film (100) may be 15 V to 45 V, 20 V to 40 V or 25 V to 35 V. When the transmittance-variable film (100) is implemented in the transparent mode, it can switch from the black mode to the transparent mode by applying a voltage thereto at an intensity within the above-described range.

In one example, upon repeated driving between the transparent mode and the black mode, the transmittance-variable film (100) may have an average of transmittance in the black mode of 2% or less. The lower limit of the transmittance may be, for example, more than 0% or 0.2% or more. On the other hand, the transmittance-variable film (100) may have the average transmittance in the transparent mode of 20% or more, 30% or more, 35% or more, or 40% or more, which may be 80% or less, 70% or less, 60% or less, 50% or less, or 45% or less. The repeated driving between the transparent mode and the black mode may mean repeated driving of an ON state and an OFF state of a voltage. The driving including the ON state and the OFF state once can be seen as one driving unit. Upon the repeated driving between the transparent mode and the black mode, the transmittance-variable film (100) can be implemented in the black mode having an excellent light shielding ratio of 98% or more after driving, as the average of transmittance in the black mode satisfy the above-described range. Each signal upon one driving may mean a voltage whose intensity, application time and frequency have each one specific value.

The electrode insulating layers (140A, 140B) comprises a fluorine-based resin. In one example, the fluorine-based resin may be an acrylate resin containing fluorine. For example, the fluorine-based resin may comprise one or more resins selected from the group consisting of poly(2,2,2-trifluoroethyl methacrylate) (PTFEMA), poly(2,2,3,3-tetrafluoropropyl methacrylate) (PTFPMA), poly(2,2,3,3,3-pentafluoropropyl methacrylate) (PPFPMA), poly(1,1,1,3,3,3-hexafluoroisopropyl methacrylate) (PHFIPMA), poly(2,2,3,4,4-hexafluorobutyl methacrylate) (PHFBMA), poly(2,2,3,3,4,4,4-heptafluorobutyl methacrylate) (PHFBMA), poly (1H,1H-perfluoro-n-octyl methacrylate) (PPFOMA) and urethane acrylate containing fluorine. The electrode insulating layers (140A, 140B) can lower the surface energy of the first electrode substrate (110) and the second electrode substrate (130) by comprising the above-described kind of fluorine-based resin, and thus prevent the charged particles (121) from being adsorbed on the pattern electrode layer (132), whereby the constant transmittance can be maintained upon the transparent mode implementation after the driving and the charged particles can easily return to the initial dispersion state upon the black mode implementation to exhibit an excellent light shielding ratio.

In one example, the electrode insulating layers (140A, 140B) may further comprise an acrylate resin, where the acrylate resin does not include fluorine, in addition to the above-described fluorine-based resin. For example, as the arylate resin, for example, a polyfunctional acrylate having 2 or more carbon atoms such as hexanediol diacrylate (HDDA), tripropylene glycol diacrylate (TPGDA), ethylene glycol diacrylate (EGDA), trimethylolpropane triacrylate (TMPTA), trimethylolpropaneethoxy triacrylate (TMPEOTA), glycerin propoxylated triacrylate (GPTA), pentaerythritol tri(tetra)acrylate (PETA) or dipentaerythritol hexaacrylate (DPHA); and a poly(meth)acrylate resin such as polymethyl methacrylate (PMMA) may be used.

When the electrode insulating layer comprises both the fluorine-based resin and the acrylic resin, the content ratio thereof can be appropriately adjusted within a range that does not inhibit the phase separation. In one example, the electrode insulating layer may comprise the acrylic resin in a ratio of 20 parts by weight to 100 parts by weight relative to 100 parts by weight of the fluorine-based resin.

The electrode insulating layers (140A, 140B) may comprise the fluorine resin on the surface adjacent to the electrophoretic layer (120) and the acrylate resin on the lower part adjacent to the first electrode substrate (110) and the second electrode substrate (130). Specifically, in a process of coating a composition for an electrode insulating layer on the first electrode substrate (110) and the second electrode substrate (130) and then drying it, the fluorine-based resin has relatively lower surface energy than that of the acrylate resin without fluorine, so that the phase separation occurs by a property of being located on the outermost surface side, which is the air layer side. Accordingly, the fluorine-based resin moves to the upper parts of the electrode insulating layers (140A, 140B), that is, the surfaces of the electrode insulating layers (140A, 140B) adjacent to the electrophoretic layer (120), and the acrylate resin without fluorine moves to the lower parts of the electrode insulating layers (140A, 140B), that is, the lower parts of the electrode insulating layers (140A, 140B) adjacent to the first electrode substrate (110) and the second electrode substrate (130), whereby the electrode insulating layers (140A, 140B) can be formed.

In one example, the surfaces of the electrode insulating layers (140A, 140B) may have a fluorine content of 15 at % (atomic %) or more. Specifically, the fluorine content of the surfaces of the electrode insulating layers (140A, 140B) may be 18 at % or more, or 20 at % or more, and the upper limit of the fluorine content of the surfaces of the electrode insulating layers (140A, 140B) may be 35 at % or less, or 30 at % or less. By containing fluorine in the above-described range on the surfaces of the electrode insulating layers (140A, 140B), the cost of the expensive fluorine-based resin can be reduced, and the surface energy of the first electrode substrate (110) or the second electrode substrate (130) can be lowered, whereby it is possible to prevent the charged particles (121) from being adsorbed on the pattern electrode layer (132), so that the constant transmittance can be maintained upon the transparent mode implementation after the driving and the charged particles can easily return to the initial dispersion state upon the black mode implementation to exhibit an excellent light shielding ratio. In addition, when the fluorine is contained in the whole electrode insulating layers (140A, 140B) instead of the surfaces thereof, that is, in a state where the phase separation does not occur, there may be a problem that the driving characteristics are lowered depending on the dielectric constant increase.

In one example, the thickness ($H_1$-$H_E$ in FIG. 1) of the electrode insulating layer (140B) formed on the top of the pattern electrode layer (112) in the first electrode substrate (110) may be, for example, 10 nm to 400 nm, which may be, specifically, 10 nm or more, 30 nm or more, or 50 nm or more, and may be 400 nm or less, 380 nm or less, or 360 nm or less. According to one example of the present disclosure, the thickness ($H_1$-$H_E$ in FIG. 1) may be in a range of 30 nm to 70 nm or in a range of 330 nm to 370 nm. That is, the thickness of the electrode insulating layer (140B) on the top of the pattern electrode layer (112) may mean a value obtained by subtracting the thickness ($H_E$) of the pattern electrode layer (112) from the total thickness ($H_1$) of the electrode insulating layer on the first base film. As the thickness ($H_1$-$H_E$ in FIG. 1) of the electrode insulating layer formed on the pattern electrode layer satisfies the above-described range, the surface energy of the first electrode substrate (110) can be lowered, whereby it is possible to prevent the charged particles (121) from being adsorbed on the pattern electrode layer (112), so that the constant transmittance can be maintained upon the transparent mode implementation after the driving and the charged particles can easily return to the initial dispersion state upon the black mode implementation to exhibit an excellent light shielding ratio.

In addition, the thickness ($H_2$) of the electrode insulating layer (140B) formed on the overall electrode layer (132) of the second electrode substrate (130) or the total thickness ($H_1$) of the insulating layer (140B) on the first electrode substrate may be each independently 150 nm to 600 nm, and specifically, may be 170 nm or more, or 190 nm or more, and may be 600 nm or less, 570 nm or less, 540 nm or less, or 510 nm or less. According to one example of the present disclosure, the thickness ($H_1$) or thickness ($H_2$) may be in the range of 180 nm to 220 nm or in the range of 480 nm to 520 nm.

As the thickness ($H_2$) of the electrode insulating layer (140B) formed on the overall electrode layer (132) of the second electrode substrate (130) satisfies the above-described range, the surface energy of the second electrode substrate (130) can be lowered, whereby it is possible to prevent the charged particles (121) from being adsorbed on the pattern electrode layer (112), so that the constant transmittance can be maintained upon the transparent mode implementation after the driving and the charged particles can easily return to the initial dispersion state upon the black mode implementation to exhibit an excellent light shielding ratio.

In this specification, the thicknesses ($H_1$, $H_2$, $H_1$-$H_E$) of the electrode insulating layers (140A, 140B) are based on thicknesses after applying a composition for the electrode insulating layers (140A, 140B) on the first and second electrode substrates (110, 130) and drying it.

The electrode insulating layer can be formed, for example, by applying a composition for forming an insulating layer on the first electrode substrate or the second electrode substrate, followed by drying.

In one example, the composition for forming an insulating layer may comprise the fluorine-based resin. In another example, the composition for forming an insulating layer may comprise both the fluorine-based resin and the acrylic resin. The specific types and content ratios of the fluorine-based resin and the acrylic resin are as described above.

The composition for forming an insulating layer may further comprise a solvent. The solvent may be an organic solvent. As the organic solvent, a solvent of hydrocarbon series, halogenated hydrocarbon series or ether series may be used. An example of the hydrocarbon series may include pentane, hexane, heptane, cyclohexane, n-decane, n-dodecane, benzene, toluene, xylene, methoxybenzene and the like. An example of the halogenated hydrocarbon series may include carbon tetrachloride, chloroform, 1,2-dichloroethane, dichloromethane, chlorobenzene and the like. An example of the ether series may include tetrahydrofuran, dioxane, propylene glycol monomethyl ether acetate and the like.

The method of applying the composition for forming an insulating layer is not particularly limited, which may be performed by a known coating method such as spin coating, bar coating, roll coating, gravure coating or blade coating.

The solvent may be removed by drying the composition for forming an insulating layer, and further the phase separation of the fluorine-based resin and the acrylic resin may occur. The drying may be performed, for example, by applying heat. In one example, the drying of the composition for forming an insulating layer may be performed at a temperature of 50° C. to 120° C. for 5 minutes to 60 minutes. The drying temperature may be specifically in the range of 60° C. to 110° C. or 70° C. to 100° C. The drying time may be specifically in the range of 5 minutes to 40 minutes, 5 minutes to 20 minutes, or 5 minutes to 15 minutes.

In another example, the surface energy of the electrode insulating layers (140A, 140B) may be 30 mN/m or less. Specifically, it may be 29 mN/m or less, and the lower limit of the surface energy may be 10 mN/m or more, 15 mN/m or more, or 20 mN/m or more. After preparing a mold substrate on which the electrode insulating layers (140A, 140B) are formed as a sample, the surface energy of the electrode insulating layers (140A, 140B) may be measured by an Owen-Wendt-Rabel-Kaeble method through a contact angle analysis of a polar solvent or a non-polar solvent using a drop shape analyzer (DSA 100, KRUSS). When the surface energy of the electrode insulating layers (140A, 140B) satisfies the above-described range, it is possible to prevent the charged particles (121) from being adsorbed on the pattern electrode layer (132), so that the constant transmittance can be maintained upon the transparent mode implementation after the driving and the charged particles can easily return to the initial dispersion state upon the black mode implementation to exhibit an excellent light shielding ratio.

The electrode insulating layers (140A, 140B) may have a contact angle for a polar solvent of 90° to 120°. Specifically, the contact angle of the electrode insulating layers (140A, 140B) for a polar solvent may be 100° to 115°. As the polar solvent, for example, water may be used. When the electrode insulating layers (140A, 140B) has the contact angle for a polar solvent satisfying the above-described range, it is possible to prevent the charged particles (121) from being adsorbed on the pattern electrode layer (132), so that the constant transmittance can be maintained upon the transparent mode implementation after the driving and the excellent light shielding ratio can be exhibited upon the black mode implementation.

In addition, the electrode insulating layers (140A, 140B) may have a contact angle for a non-polar solvent of 55° to 95°. Specifically, the contact angle of the electrode insulating layers (140A, 140B) for a non-polar solvent may be 59° to 92°. As the non-polar solvent, for example, diiodomethane may be used. When the electrode insulating layers (140A, 140B) has the contact angle for a non-polar solvent satisfying the above-described range, it is possible to prevent the charged particles (121) from being adsorbed on the pattern electrode layer (132), so that the constant transmittance can be maintained upon the transparent mode implementation after the driving and the excellent light shielding ratio can be exhibited upon the black mode implementation.

The present disclosure also relates to a use of the transmittance-variable film. The transmittance-variable film of the present disclosure can switch between the transparent mode and the black mode depending on voltage application, and upon repeated driving of the transparent mode and the black mode, it can maintain the transmittance constant in the transparent mode and exhibit an excellent light shielding ratio in the black mode. Such a transmittance-variable film can be applied, for example, to a smart window. In this specification, the term "smart window" means a window having a function of controlling the transmittance of incident light, for example, sunlight, which is a concept that encompasses functional elements named a so-called smart blind, electronic curtain, transmittance-variable glass or dimming glass, and the like. The method of constructing such a smart window is not particularly limited, and a conventional method may be applied as long as the transmittance-variable film is included.

Advantageous Effects

Upon repeated driving of a transparent mode and a black mode, the transmittance-variable film of the present disclosure can maintain the transmittance constant in the transparent mode and exhibit an excellent light shielding ratio in the black mode, and such a transmittance-variable film can be usefully used in a smart window.

present disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosurepresent disclosure

BEST MODE

Hereinafter, the present disclosure will be specifically described by way of the examples, but the scope of the present disclosure is not limited by the following examples.

Example 1

Preparation of Composition for Electrophoretic Layer

A composition for an electrophoretic layer was prepared by dispersing 3.5 wt % of carbon black having a particle diameter of 200 nm in a non-polar hydrocarbon solvent (Isopar G, EXXONMOBIL CHEMICAL).

Production of First Electrode Substrate

A first electrode substrate was produced by forming an Al metal mesh on a polyethylene terephthalate film (width×length=100 mm×100 mm) through reverse offset printing to have a line width in the range of 3 μm, an average pitch of 50 μm and a thickness of 145 nm.

Production of Second Electrode Substrate

A second electrode substrate was produced by forming an ITO electrode on the entire surface of a polyethylene terephthalate film (width×length=100 mm×100 mm) to have a thickness of 100 nm using a sputtering method.

Preparation of Composition for Electrode Insulating Layer

A composition for an electrode insulation layer was prepared by mixing poly(2,2,3,3,3-pentafluoropropyl methacrylate) (PPFPMA) resin represented by Formula 1 below as a fluorine-based resin with a poly(methyl methacrylate) (PMMA) resin in tetrahydrofuran as a solvent at a weight ratio of 1:1.

[Formula 1]

Production of Transmittance-Variable Film

The composition for an electrode insulating layer was applied on each of the surface of the first electrode substrate on which the Al metal mesh was formed and the surface of the second electrode substrate on which the ITO electrode was formed, and then dried at 80° C. for 10 minutes to form an electrode insulating layer with a thickness of 200 nm. At this time, in the composition for an electrode insulating layer, the phase separation occurred, in which the PPFPMA resin as the fluorine-based resin migrated to the surface, that is, the upper part, of the electrode insulating layer and the PMMA resin as an acrylate resin migrated to the lower part of the electrode insulating layer. Thereafter, a transmittance-variable film was produced by applying the composition for an electrophoretic layer on the electrode insulating layer formed on the first electrode substrate and then laminating the second electrode substrate such that the electrode insulating layer of the second electrode substrate was in contact with the composition for an electrophoretic layer.

Examples 2 to 4 and Comparative Example 1

A transmittance-variable film was produced in the same manner as in Example 1, except that the kinds of raw materials used in the preparation of the composition for an electrode insulating layer, the mixing ratio of the raw materials, and the thickness of the electrode insulating layer formed on the first electrode substrate and the second electrode substrate were changed as shown in Table 1 below. At this time, upon the production of the transmittance-variable film produced in Example 2, in the process of applying the composition for an electrode insulating layer and then drying it, the phase separation occurred, in which the ECBECRYL 8110 resin as the fluorine-based resin in the composition for an electrode insulating layer migrated to the surface, that is, the upper part, of the electrode insulating layer and the TMPTA resin as the acrylate resin migrated to the lower part of the electrode insulating layer. Also, in the transmittance-variable film produced in Example 4, in the process of applying the composition for an electrode insulating layer and then drying it, the phase separation occurred, in which the PPFPMA resin as the fluorine-based resin in the composition for an electrode insulating layer migrated to the surface, that is, the upper part, of the electrode insulating layer and the TMPTA resin as the acrylate resin migrated to the lower part of the electrode insulating layer.

TABLE 1

| Raw Material | Example 2 TMPTA + EBECRYL 8110 | Example 3 EBECRYL 8110 | Example 4 TMPTA + PPFPMA | Comparative Example 1 TMPTA |
|---|---|---|---|---|
| Mixing Ratio | 1:1 | — | 1:1 | — |
| Thickness (nm) | 200 | 200 | 500 | 250 |

TMPTA: trimethylolpropane triacrylate resin
EBECRYL 8110: urethane acrylate resin containing fluorine (product from Allnex)

Comparative Example 2

Figure 4:
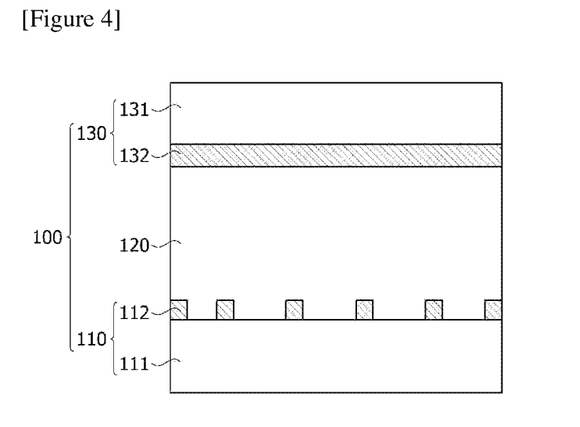
FIG. 4 is a diagram illustratively showing the transmittance-variable film of Comparative Example 2 of the present disclosure.

As shown in FIG. 4, a transmittance-variable film was produced in the same manner as in Example 1 above, except that an electrode insulating layer was not formed on the patterned Al electrode of the first electrode substrate and the ITO electrode of the second electrode substrate, the composition for an electrophoretic layer was applied on the patterned Al electrode of the first electrode substrate and then the second electrode substrate was laminated so that the ITO electrode of the second electrode substrate was in contact with the composition for an electrophoretic layer.

Evaluation Example 1. Measurement of Fluorine Content on the Surface of the Electrode Insulating Layer The fluorine content on the surface of each electrode insulating layer in Examples and Comparative Examples was measured as an at % content by X-ray irradiation at an angle of 20° using an XPS instrument (K-Alpha, Thermo Scientific).

Evaluation Example 2. Surface Energy Evaluation

After the first electrode substrates, with or without the formed electrode insulating layer, produced in Examples 1 to 4 and Comparative Examples 1 and 2 were made into specimens having a width of 5 cm×a length of 7 cm in order to manufacture them in a sheet form, distilled water and diiodomethane were each dropped one by one on each specimen with a spuit, and then contact angles were repeatedly measured five times at room temperature using a drop shape analyzer (DCA100, KRUSS) to evaluate their average values, the surface energy was calculated from the contact angles of the water droplet surface and the diiodomethane surface obtained therefrom using the Owen-Wendt-Rabel-Kaeble method, and the results were described in Table 2 below.

TABLE 2

|  | Example 1 | Example 2 | Example 3 | Example 4 | Comparative Example 1 | Comparative Example 2 |
|---|---|---|---|---|---|---|
| Water (°) | 105.8 | 112.1 | 113.1 | 104.0 | 84.4 | 86.6 |
| Diiodomethane (°) | 91.2 | 66.5 | 59.9 | 87.9 | 47.9 | 50.6 |
| Surface Energy (mN/m) | 20.6 | 26.6 | 28.9 | 22.1 | 43.7 | 41.7 |
| Fluorine Content of Electrode Insulating Layer Surface (at %) | 20.6 | 26.6 | 28.9 | 22.1 | — | — |

Evaluation Example 3. Evaluation of Transmittance According to Voltage Driving

In each of the transmittance-variable films of Examples and Comparative Examples, an NF programmable AC/DC power source EC1000S (NF Corporation) as a power source was connected thereto so that the (+) voltage was applied to the patterned Al electrode of the first electrode substrate and the (−) voltage was applied to the ITO electrode of the second electrode substrate. Thereafter, when the voltage was not applied to the electrophoretic layer, the transmittance-variable film implemented the black mode. Thereafter, the transmittance-variable film implemented the transparent mode by applying a voltage of 30 V to the electrophoretic layer at a frequency of 500 Hz for 15 seconds. At this time, upon repeated driving between the transparent mode and the black mode, it was performed 10 times repeatedly over time, and the transmittance in the black mode and the transmittance mode was measured as transmittance changes for visible light before and after voltage application using an electro-optic measuring instrument (LCMS-200, Sesim Photonics Technology) and the results were represented in Table 3 below.

TABLE 3

| | | Example 1 | Example 2 | Example 3 | Example 4 | Comparative Example 1 | Comparative Example 2 |
|---|---|---|---|---|---|---|---|
| Black Mode (%) | Average | 1.2 | 1.6 | 1.8 | 1.4 | 2.6 | 2.5 |
| Transparent Mode (%) | Average | 40 | 40 | 41 | 40 | 40 | 37 |

Figure 5:
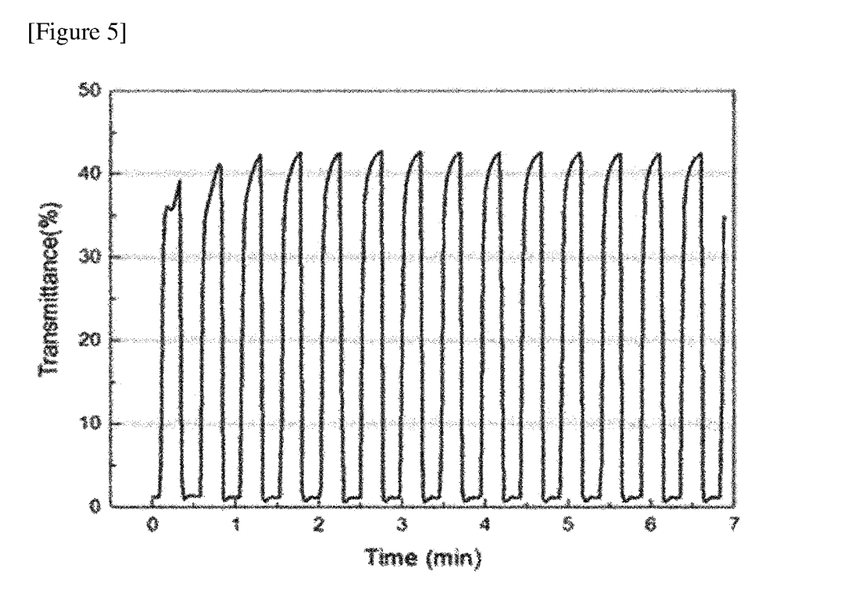
FIG. 5 is a graph showing transmittance of the transmittance-variable film produced in Example 1 of the present disclosure according to voltage signal application.
Figure 6:
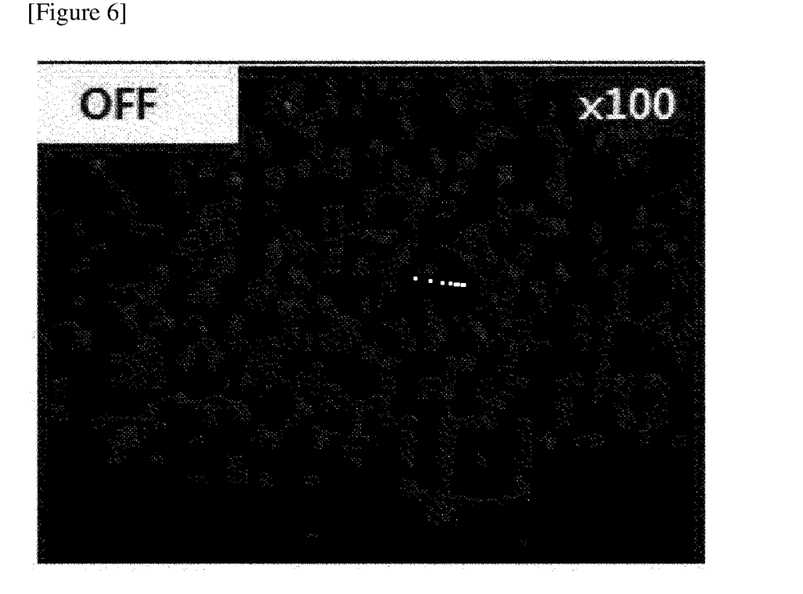
FIG. 6 is an optical microscope image of the transmittance-variable film produced in Example 1 of the present disclosure as measured in a black mode after driving.
Figure 7:
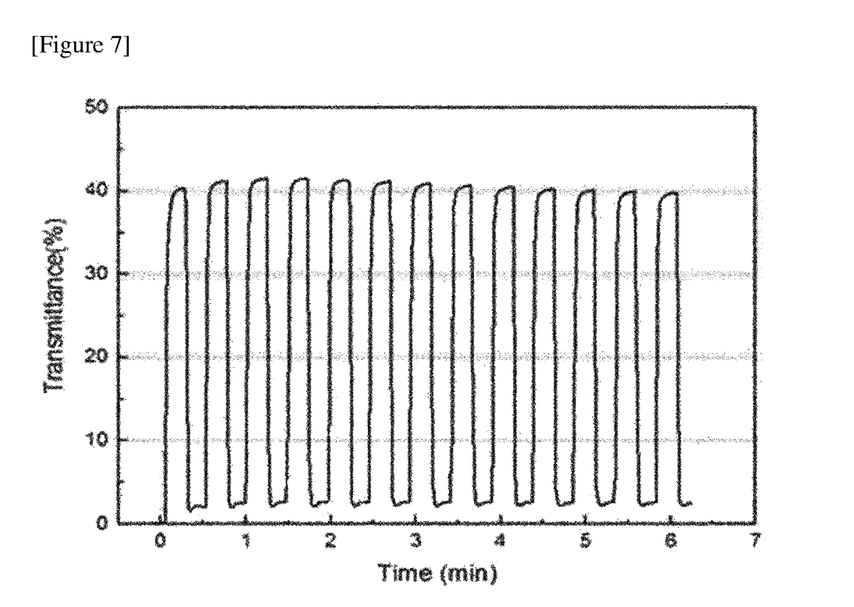
FIG. 7 is a graph showing transmittance of the transmittance-variable film produced in Comparative Example 2 of the present disclosure according to voltage signal application.
Figure 8:
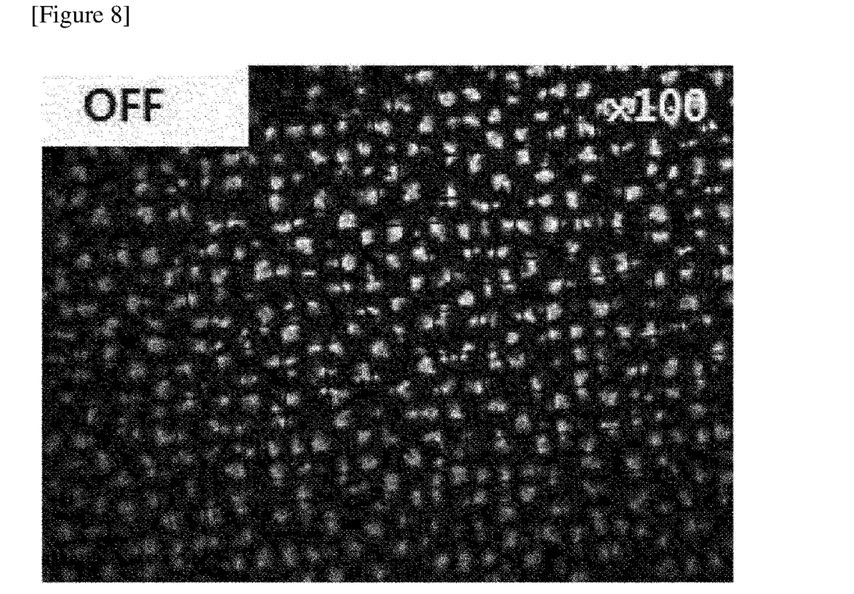
FIG. 8 is an optical microscope image of the transmittance-variable film produced in Comparative Example 2 of the present disclosure as measured in a black mode after driving.

As shown in Table 3, in the case of using the electrode insulating layer containing the fluorine-based resin in the transmittance-variable film, it was confirmed that as in the transmittance-variable films of Examples 1 to 4, when the transmittance-variable films were repeatedly driven in the transparent mode and the black mode, the average of the black mode was 2% or less. Specifically, in the case of the transmittance-variable film of Example 1, it can be confirmed that as shown in FIG. 5, when the transparent mode and the black mode are repeatedly driven, the average of the transmittance in the black mode from the 4th driving to the 11th driving is 1.2% and as shown in FIG. 6, the black mode having an excellent light shielding ratio is exhibited. At this time, the section from the first driving to the third driving means an aging section in a state immediately before the transmittance-variable characteristic is found. That is, the average of the transmittance in the black mode measured above is the average of the transmittance measured in the black mode from the 4th driving to the 11th driving. On the other hand, in the case where the insulating layer containing the fluorine-based resin was not used in the transmittance-variable film, it was confirmed that as in the transmittance-variable films of Comparative Examples 1 and 2, the average of the transmittance in the black mode exceeded 2% when the transmittance-variable films were repeatedly driven in the transparent mode and the black mode. Specifically, in the case of the transmittance-variable film of Comparative Example 2 in which the insulating layer was not used in the transmittance-variable film, it was confirmed that as shown in FIG. 7, when the transparent mode and the black mode were repeatedly driven, the average of the transmittance in the black mode from the 4th driving to the 11th driving was 2.5%, and as shown in FIG. 8, the black mode having a low light shielding ratio was exhibited.

Furthermore, as shown in Table 3, in the case of the transmittance-variable film of Comparative Example 2 in which the insulating layer was not used in the transmittance-variable film, it was confirmed that when the transmittance-variable film was repeatedly driven in the transparent mode and the black mode, the average of the transmittance in the transparent mode was 37% and thus it exhibited low transmittance. In addition, as shown in FIG. 7, it was confirmed that when the transmittance-variable film of Comparative Example 2 above was repeatedly driven in the transparent mode and the black mode, the transmittance in the transparent mode from the 4th driving to the 11th driving was not constant.

Therefore, when the transmittance-variable films of Examples 1 to 5 were used, it was confirmed that they had excellent light shielding ratios in the black mode after driving and excellent transmittance in the transparent mode over time, as compared with the transmittance-variable films of Comparative Examples 1 and 2.

The invention claimed is:

1. A transmittance-variable film, comprising:
a first electrode substrate;
a first electrode insulating layer disposed on the first electrode substrate;
an electrophoretic layer;
a second electrode substrate; and
a second electrode insulating layer disposed on the second electrode substrate,
wherein the first electrode substrate, the electrophoretic layer, and the second electrode substrate are sequentially arranged,
wherein any one of the first electrode substrate or the second electrode substrate comprises a pattern electrode layer, and the other comprises an overall electrode layer,
wherein the first and second electrode insulating layers contain a fluorine-based resin,
wherein the electrophoretic layer comprises charged particles,
wherein the transmittance-variable film is capable of being switched between a black mode and a transparent mode,
wherein the charged particles are dispersed in the dispersion solvent to implement the black mode, and
wherein the charged particles move to the pattern electrode layer to implement the transparent mode.

2. The transmittance-variable film according to claim 1, wherein the first electrode substrate comprises a pattern electrode layer, and wherein the second substrate comprises an overall electrode layer.

3. The transmittance-variable film according to claim 2, wherein the first electrode insulating layer is formed on the entire surface of the pattern electrode layer, and wherein the second electrode insulating layer is formed on the entire surface of the overall electrode layer.

4. The transmittance-variable film according to claim 1, wherein the electrophoretic layer further comprises a dispersion solvent.

5. The transmittance-variable film according to claim 1, wherein the charged particles comprise one or more particles selected from the group consisting of carbon black, ferric oxides, chromium copper (CrCu) and aniline black.

6. The transmittance-variable film according to claim 1, the transmittance-variable film capable of being configured in a transparent mode,
wherein the charged particles move to the pattern electrode layer to implement the film in the transparent mode, and
wherein the charge particles are not adsorbed on the pattern electrode layer.

7. The transmittance-variable film according to claim 1, wherein the transmittance-variable film capable of being switched between a black mode and a transparent mode,
Wherein, upon repeated driving between a transparent mode and a black mode, a voltage for implementing the black mode is −10 V to −30 V, and wherein a voltage for implementing the transparent mode is 10 V to 50 V.

8. The transmittance-variable film according to claim 7, wherein upon repeated driving between the transparent mode and the black mode, the average of transmittance in the black mode is 2% or less.

9. The transmittance-variable film according to claim 1, wherein the fluorine-based resin is an acrylate resin containing fluorine.

10. The transmittance-variable film according to claim 1, wherein the first and second electrode insulating layers further comprise an acrylate resin, wherein the acrylate resin does not include fluorine.

11. The transmittance-variable film according to claim 10, wherein the acrylate resin is one or more resins selected from the group consisting of hexanediol diacrylate (HDDA), tripropylene glycol diacrylate (TPGDA), ethylene glycol diacrylate (EGDA), trimethylolpropane triacrylate (TMPTA), trimethylolpropaneethoxy triacrylate (TMPEOTA), glycerin propoxylated triacrylate (GPTA), pentaerythritol tri(tetra)acrylate (PETA), dipentaerythritol hexaacrylate (DPHA) and polymethyl methacrylate (PMMA).

12. The transmittance-variable film according to claim 10, wherein the first and second electrode insulating layers comprise the fluorine-based resin on surfaces adjacent to the electrophoretic layer, and comprise the acrylate resin on surfaces adjacent to the first and second electrode substrates.

13. The transmittance-variable film according to claim 1, wherein the first and second electrode insulating layers comprise 15 atomic percent (at %) or more of fluorine on the surfaces thereof.

14. The transmittance-variable film according to claim 3, wherein a portion of the first electrode insulating layer formed on the top of the pattern electrode layer has a thickness in a range of 10 nm to 400 nm.

15. The transmittance-variable film according to claim 3, wherein the second electrode insulating layer formed on the top of the overall electrode layer has a thickness in a range of 150 nm to 600 nm.

16. The transmittance-variable film according to claim 1, wherein the first and second electrode insulating layers have a surface energy of 30 mN/m or less.

17. The transmittance-variable film according to claim 1, wherein the first and second electrode insulating layers have a contact angle for a polar solvent of 90° to 120°.

18. The transmittance-variable film according to claim 1, wherein the first and second electrode insulating layers have a contact angle for a non-polar solvent of 55° to 95°.

19. A smart window comprising the transmittance-variable film of claim 1.

* * * * *